United States Patent [19]

Fasco

[11] E Patent Number: Re. 31,654

[45] Reissued Date of Patent: Aug. 28, 1984

[54] ANCHOR

[76] Inventor: Rudolph Fasco, 2210 SW. 100th Ave., Miami, Fla. 33165

[21] Appl. No.: 533,442

[22] Filed: Sep. 19, 1983

Related U.S. Patent Documents

Reissue of:

[64] Patent No.: 4,369,727
Issued: Jan. 25, 1983
Appl. No.: 207,252
Filed: Nov. 17, 1980

[51] Int. Cl.[3] ..... B63B 21/44
[52] U.S. Cl. ..... 114/297; 114/310
[58] Field of Search ..... 114/294–295, 114/297–299, 301, 310; 52/162–164

[56] References Cited

U.S. PATENT DOCUMENTS

| | | | |
|---|---|---|---|
| 2,007,667 | 7/1935 | Stubbs | 114/298 |
| 3,762,357 | 10/1973 | Ehrhardt | 114/298 |
| 4,114,554 | 9/1978 | Miller | 114/298 |
| 4,134,355 | 1/1979 | Carruthers | 114/304 |
| 4,210,092 | 7/1980 | Battersby | 114/299 |

*Primary Examiner*—Trygve M. Blix
*Assistant Examiner*—Jesus D. Sotelo
*Attorney, Agent, or Firm*—Oltman and Flynn

[57] ABSTRACT

An improved anchor comprising a longitudinal shank assembly, a fluke assembly mounted on an axle that is perpendicularly disposed with respect to the shank assembly and a release mechanism that allows, when tripped, the fluke assembly to rotate freely to form an angle of 180 degrees with respect to the shank assembly. The release mechanism is designed so that tripping occurs when the angle of the chain or cable is above a desired critical angle.

9 Claims, 8 Drawing Figures

3A
3A'
10
20
21
22
24
25
26
30
32
35
39
40
42
43
44
50
51
70
71
72
80
38'
A

ANCHOR

Matter enclosed in heavy brackets [ ] appears in the original patent but forms no part of this reissue specification; matter printed in italics indicates the additions made by reissue.

BACKGROUND OF THE INVENTION

1. Field of Invention.

This invention relates to [anchors] *an anchor*, and in particular[,] to [those anchors] *an anchor* provided with pivotally mounted flukes and with a release mechanism to facilitate its unmooring.

2. Description of the Prior Art.

An anchor moors a vessel to the sea bed, generally by a combination of its own weight and by hooking itself into the bottom. See The Illustrated Science and Invention Encyclopedia, H. S. Stuttman Co., Inc., Publishers, N.Y., Vol. 1, page 110. An ideal anchor is designed so that a near horizontal pull causes it to dig itself in firmly, but an upward pull dislodges it easily. It is attached to the vessel by a cable—this is a heavy chain on large ships. Anchors in use today provide a more or less firm mooring but require winching in the cable and running the vessel over the anchor's position for its unmooring. When the cable is more or less vertical the anchor should dislodge. However, it does not always dislodge easily. Sometimes, an underwater utility cable or mangrove root gets caught between the flukes and pulling the anchor out is just an exercise in futility. One of the most popular anchors, the Danforth anchor, is particularly susceptible to this problem.

SUMMARY OF THE INVENTION

It is the main object of the present invention to provide an anchor capable of reliably mooring and unmooring a vessel easily. Another object of this invention is to provide an inexpensive anchor requiring a minimum of storage space aboard the vessel.

Further objects of the invention will be brought out in the following part of the specification, wherein *the* detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings, in which.

DETAILED DESCRIPTION [OF THE PREFERRED EMBODIMENT]

Figures 1, 1A, 1B, 2, 2A:
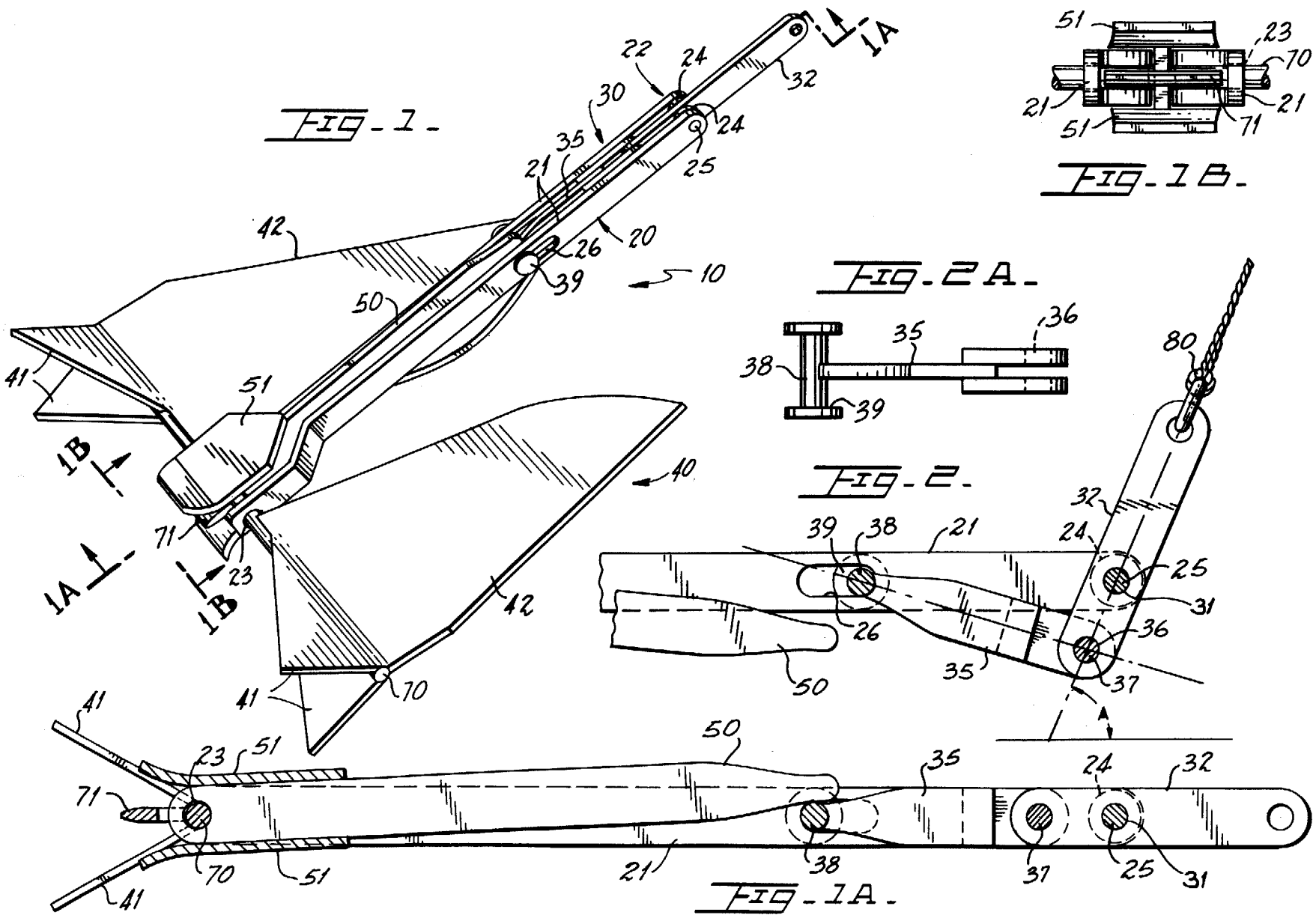
FIG. 1 is an oblique view of [the preferred] *one* embodiment of the present invention.
FIG. 1a shows a side cross-section as viewed from line 1A.
FIG. 1b represents a partial view of FIG. 1a, from the left.
FIG. 2 illustrates a detailed side view of the release mechanism.
FIG. 2A shows a top view of the tripping lever element.

Referring now to FIG. 1, [where the preferred embodiment of the present invention is shown,] in perspective, we can observe that the anchor 10 basically comprises a shank assembly 20, a release mechanism 30 and a fluke assembly 40. The shank assembly [30] *20* is composed of two elongated, *generally* flat [rods], *parallel, longitudinal, support bars* 21 which are spaced apart from each other by spacer 22 on one end and the other end of the shank assembly terminates with *the support bars* 21 forming a fork with [hole] *holes* 23 substantially towards the end of [rods] *bars* 21. Spacer assembly 22 is basically a pin 25 (*FIGS. 1A and 2*) riveted to the ends of [rod] *bars* 21 and washers 24 sandwiching chain lever 32 *between them*. Pin 25 is inserted through an opening 31 [of] *in* chain lever 32 and lever 32 is kept in place by a couple of washers 24 on each side of lever 32. Lever 32 pivots around pin 25 and is pivotally connected to tripping lever 35 which has a fork termination (*FIG. 2A*) with holes 36 and a riveted pin 37 (*FIG. 2*) on one end and the other end being attached to a sliding bar 38 inserted and protruding through a longitudinal slot 26 in [said rod] *each bar* 21 and kept in place by [a] headed [termination] *terminations* 39. An elongated, flat, pivoted, *longitudinal bar* member 50 rests on one end on said sliding bar 38 (*FIG. 1A*) and the other end having stoppers 51 firmly secured, preferably welded, to member 50. As shown in FIGS. 1A and 1B, axle 70 is provided with an integrally built U-shape protrusion 71 positioned in the center of axle 70 and sandwiched between the fork termination of shank assembly 20. Member 50 is pivotally mounted in the center of axle 70 and is capable of rotating around it. By virtue of U-shaped protrusion 71 [in] *on* axle 70, when member 50, and consequently stoppers 51, rotate it will cause fluke assembly 40 to rotate when stoppers 51 come in contact with protrusion 71 since flukes 42 are rigidly attached to axle 70. And, when fluke assembly 40 pivots around *the axis of* axle 70, member 50 will follow, from the same transmission of forces. In practice, the rotation of the fluke assembly 40 is caused by tripping palm 41, by digging in the seabed of flukes 42 or by the unequal weight distribution of fluke assembly 40. Rotation of the fluke assembly 40 will induce rotation of member 50, as mentioned above, causing it to meet sliding bar 38 on which it rests, thereby preventing any further rotational movement of fluke assembly 40. Once you start pulling chain 80 to dislodge anchor 10, the vessel will travel towards the anchor, making the angle A formed between the seabed plane and chain 80 [to] increase from about 20 or 30 degrees to about 70 degrees, where tripping lever 35 is pulled enough to make member 50 trip and suddenly releasing the force being applied by stopper 51 to protrusion 71, allowing member 50 and fluke assembly 40 to rotate freely, as shown in FIG. 2. Before tripping, flukes 42 could move out a maximum of 45 degrees with respect to the axis of shank assembly 20. After tripping, assuming we are still trying to dislodge the anchor, the fluke assembly 40 will rotate from the 45 degree maximum angle of the flukes in the preferred embodiments towards a 180 degree angle with respect to the shaft assembly 20. The benefits derived are obvious since it will allow the user to pull the flukes out in the opposite direction. This will prevent the user from being forced to pass the vessel over the anchor, risking that the anchor cable could get caught with the propeller. Also, if power is not being used and the anchor is being pulled without other help, it is harder to pull the boat towards the anchor as the angle of the anchor cable with respect to the seabed approaches 90 degrees. Mathematically, if we call [“1”] “$L$” the longitude of the cable and “x” the horizontal distance from the vessel to a point that is on the sea surface, perpendicularly above the anchor, then the rate of change of force, “F”, with respect to “x” is inversely proportional to [“1”] “$L$”.

$$\left[\frac{\Delta F}{\Delta x} \alpha \frac{1}{1}\right] \frac{\Delta F}{\Delta x} \sim \frac{1}{L}$$

Therefore, it is submitted that the present mechanism permits dislodging an anchor with a minimum of force required. The tripping angle A, of course, may be adjusted through the selection of dimensions for member 50 and/or tripping lever 35.

Figures 3, 3A, 4:
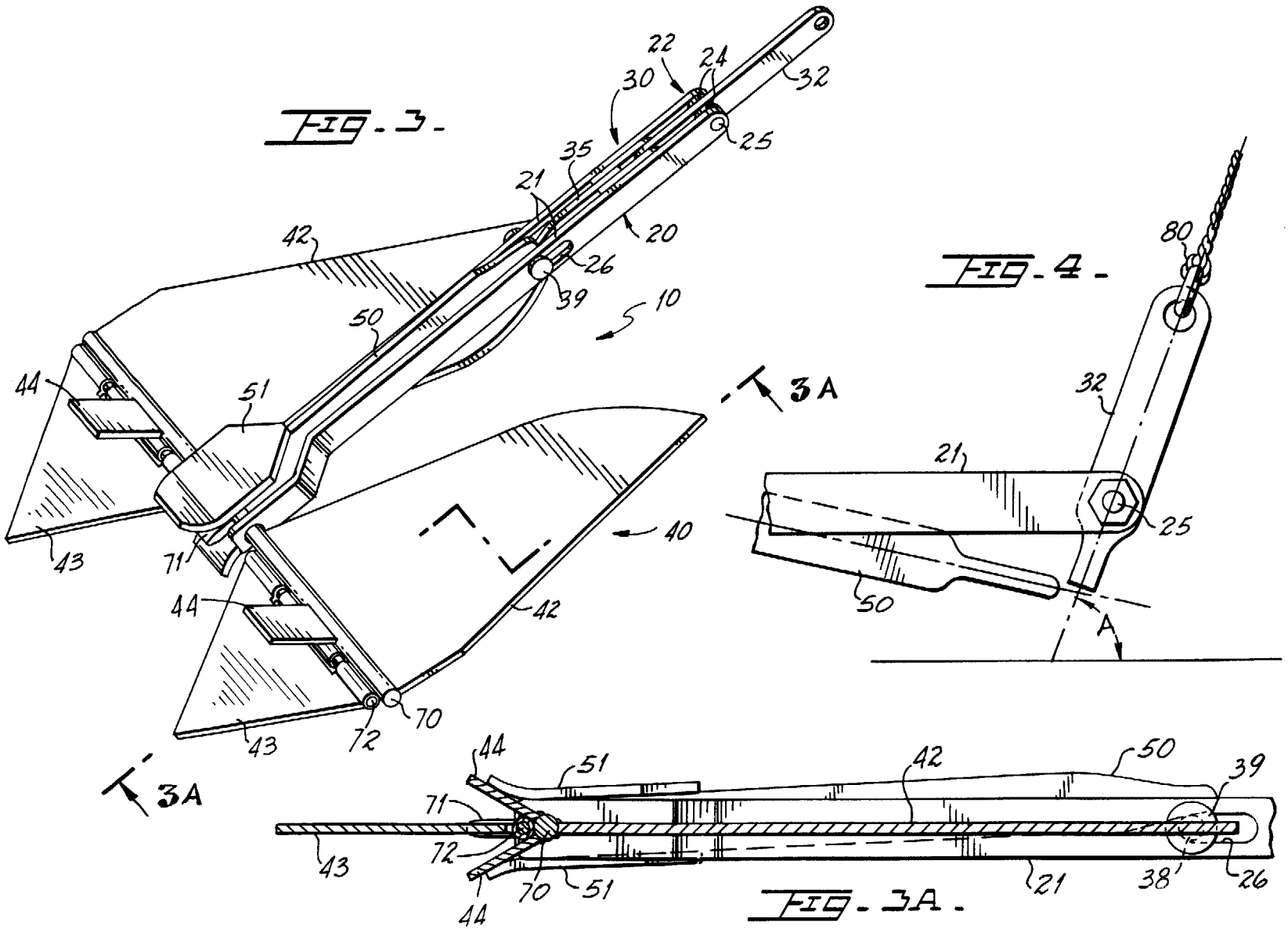
FIG. 3 illustrates an alternative embodiment for this invention incorporating hinged tripping palms.
FIG. 3a shows a side cross-section as viewed from line 3A.
FIG. 4 illustrates a detailed side view of an alternative release mechanism.

It is worthwhile noting that the present invention may be practiced with a simplified version [of the preferred embodiment] which eliminates tripping lever 35, as shown in FIG. 4. Here, we are using the end of chain lever 32 that is not connected to the chain 80 as our tripping member, provided, of course, that said lever [35] *32* is of sufficient length as to be able to intercept member 50 when angle A is less than the desired critical tripping angle. *In this simplified embodiment the chain lever 32 presents an end on the opposite side of its pivot 25 from its attachment to the anchor cable 80. The free end of longitudinal bar member 50 overlies this end of chain lever 32 until the pull of the anchor cable increases the angle of the chain lever with respect to the shank assembly 20 enough to move this end of the chain lever out from beneath the free end of longitudinal bar member 50. This tripping action permits the free end of bar 50 to drop down against the seabed and, through the lost-motion coupling between elements 51 and 71, it enables the fluke assembly 40 to pivot in the same direction as bar member 50. Consequently, the flukes 42 can disengage from the sea bottom as the anchor cable 80 is continued to be pulled up.*

Another alternative embodiment is shown in FIGS. 3 and 3A, wherein hinged tripping palm 43 is hingedly mounted to axle 72 which is parallel to axle 70. The hinged tripping palm 43 in this embodiment pivots around said axle 72 an angle of about 60 degrees and it basically performs the same function as the fixed tripping palms 41 of the above mentioned preferred embodiment. Stopper 44 for hinged tripping palms 43 keeps said members from rotating more than 60 degrees, in the preferred embodiment, while still performing the needed tripping function.

*In each of the illustrated embodiments of this invention the fluke assembly 40 and the longitudinal bar 50 can rotate completely around (i.e., through 360 degrees) the axis of the fluke axle 70. This provides an advantageous mode of operation of the anchor, both in embedding its flukes in the seabed after the anchor is lowered and in releasing its flukes from the seabed when the anchor cable is raised.*

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. In an anchor of the type having a shank assembly comprising a pair of parallel longitudinal support bars spaced apart from each other, an axle perpendicular to said shank assembly and mounted on one end thereof, said axle having a U-shaped built-in protrusion in the middle and a plurality of flukes rigidly secured to said axle on opposite sides of said shank assembly, the improvement comprising:

(a) a chain lever pivotally mounted on the other end of said shank assembly, between said support bars, and having one end connected to the anchor line, (b) a longitudinal bar member pivotally mounted on said axle on one end, positioned between said support bars, and provided with a pair of stoppers which contact said protrusion when said bar member is pivotally rotated, and (c) a plurality of tripping palms rigidly mounted to said axle; and (d) tripping means pivotally connected to the other end of said chain lever and positioned in cooperative support for said longitudinal bar member when the angle of said chain lever with respect to the shank assembly is below a tripping angle.

2. The improved anchor set forth in claim 1 wherein said longitudinal support bars are flat and provided with longitudinal slots and said tripping means comprises a tripping lever having a sliding bar on one end and said sliding bar protrudes through said slots and being kept in place with headed terminations on each side of said sliding bar.

3. In an anchor of the type having a shank assembly comprising a pair of parallel longitudinal support bars spaced apart from each other, an axle perpendicular to said shank assembly and mounted on one end thereof, said axle having a U-shaped built-in protrusion in the middle and a plurality of flukes rigidly secured to said axle on opposite sides of said shank assembly, the improvement comprising:

(a) a chain lever pivotally mounted on the other end of said shank assembly between said support bars, and having one end connected to the anchor line, (b) a longitudinal bar member pivotally mounted on said axle on one end, positioned between said support bars, and provided with a pair of stoppers which contact said protrusion when said bar member is pivotally rotated, and (c) a plurality of tripping palms hingedly mounted to said axle; and (d) tripping means pivotally connected to the other end of said chain lever and positioned in cooperative support for said longitudinal bar member when the angle of said chain lever with respect to the shank assembly is below a tripping angle.

*4. An anchor for a water vessel comprising:*

*an elongated rigid shank assembly;*

*a chain lever pivotally coupled intermediate its length to said shank assembly near one end of the latter, said chain lever on one side of its pivotal coupling to the shank assembly having means for attaching it to an anchor cable extending to the vessel, said chain lever having an end on the opposite side of said pivotal coupling;*

*a fluke assembly pivoted to said shank assembly near the opposite end of the latter from the chain lever;*

*a longitudinal bar member pivoted to said shank assembly near said opposite end of the latter and extending along said shank assembly and having a free end for overlying engagement with said end of the chain lever;*

*and means providing a lost-motion coupling between said bar member and said fluke assembly for moving said bar member into overlying engagement with said end of the chain lever in response to pivotal movement of said fluke assembly into engagement with the bottom of the body of water where the vessel is located;*

*said chain lever, when pulled by the anchor cable to increase its angle to the shank assembly, moving its end out from beneath the free end of said bar member and permitting the latter to drop and through said lost-motion coupling enable said fluke assembly to pivot in the same direction as said bar member for releasing itself from the bottom.*

*5. An anchor according to claim 4 wherein:*

*said lost-motion coupling between said bar member and said fluke assembly is near said opposite end of the shank assembly.*

*6. An anchor according to claim 5, wherein:*

*said shank assembly comprises a pair of spaced parallel elongated support bars;*

*said fluke assembly comprises first and second flukes located on opposite sides of said bars of the shank assembly, and an axle attached to said flukes and rotatably mounted in said shank assembly;*

*and said longitudinal bar member passes between said support bars of said shank assembly and is pivotally mounted on said axle.*

*7. An anchor according to claim 6 wherein:*

*said flukes are substantially flat;*

*and said fluke assembly also comprises a respective pair of tripping palms for each fluke rigidly connected to said axle and extending on the opposite side of the axle from the respective fluke in a direction longitudinally of the shank assembly, with the tripping palms of each pair extending on opposite sides of the plane of the respective fluke.*

*8. An anchor according to claim 7 wherein:*

*said fluke assembly and said longitudinal bar member are each free to rotate through substantially 360 degrees around the axis of said axle when said free end of said bar member is disengaged from said end of the chain lever.*

*9. An anchor according to claim 4 wherein:*

*said fluke assembly and said longitudinal bar member are each free to pivot through substantially 360 degrees on said shank assembly when said free end of said bar member is disengaged from said end of the chain lever.*

* * * * *